(12) United States Patent
Verbruggen

(10) Patent No.: US 8,661,912 B2
(45) Date of Patent: Mar. 4, 2014

(54) DEVICE AND METHOD FOR MEASURING STRAIN

(75) Inventor: Timotheus Wilhelmus Verbruggen, Petten (NL)

(73) Assignee: Stichting Energieonderzoek Centrum Nederland, Petten (NL)

(*) Notice: Subject to any disclaimer, the term of this patent is extended or adjusted under 35 U.S.C. 154(b) by 231 days.

(21) Appl. No.: 13/258,148

(22) PCT Filed: Dec. 22, 2009

(86) PCT No.: PCT/NL2009/050792
§ 371 (c)(1),
(2), (4) Date: Sep. 21, 2011

(87) PCT Pub. No.: WO2010/117260
PCT Pub. Date: Oct. 14, 2010

(65) Prior Publication Data
US 2012/0011917 A1    Jan. 19, 2012

(30) Foreign Application Priority Data
Apr. 10, 2009   (NL) ..................................... 2002743

(51) Int. Cl.
*G01B 5/30*     (2006.01)
(52) U.S. Cl.
USPC .............................................. 73/760; 73/774
(58) Field of Classification Search
USPC .......................................... 73/760, 774, 778
See application file for complete search history.

(56) References Cited

U.S. PATENT DOCUMENTS

| | | | | |
|---|---|---|---|---|
| 3,780,817 A | * | 12/1973 | Videon | 177/136 |
| 4,430,895 A | * | 2/1984 | Colton | 73/497 |
| 4,804,053 A | * | 2/1989 | Nordstrom | 177/211 |
| 5,313,022 A | * | 5/1994 | Piroozmandi et al. | 177/211 |
| 6,606,913 B1 | * | 8/2003 | Gianchandani | 73/777 |
| 7,066,032 B2 | * | 6/2006 | Maeno et al. | 73/768 |
| 7,077,446 B2 | * | 7/2006 | Kameda et al. | 294/106 |
| 7,461,560 B2 | * | 12/2008 | Arms et al. | 73/786 |

FOREIGN PATENT DOCUMENTS

| | | |
|---|---|---|
| EP | 1 816 432 A1 | 8/2007 |
| WO | 97/15805 A1 | 5/1997 |

OTHER PUBLICATIONS

International Search Report, dated Feb. 8, 2010, from corresponding PCT application.

* cited by examiner

*Primary Examiner* — Max Noori
(74) *Attorney, Agent, or Firm* — Young & Thompson

(57) ABSTRACT

A device for measuring strain on a surface of an object (3) includes a carrier (5) which is provided with a central section (6) and two end sections (8) which are arranged on either side of the central section (6). A strain element (10) is connected to the carrier (5) and is provided with a strain sensor. The device (1) for measuring strain includes two supporting feet (9) which can be directly attached to the surface of the object (3) at a distance apart. The end sections (8) of the carrier (5) are detachably connected to in each case one supporting foot (9).

19 Claims, 6 Drawing Sheets

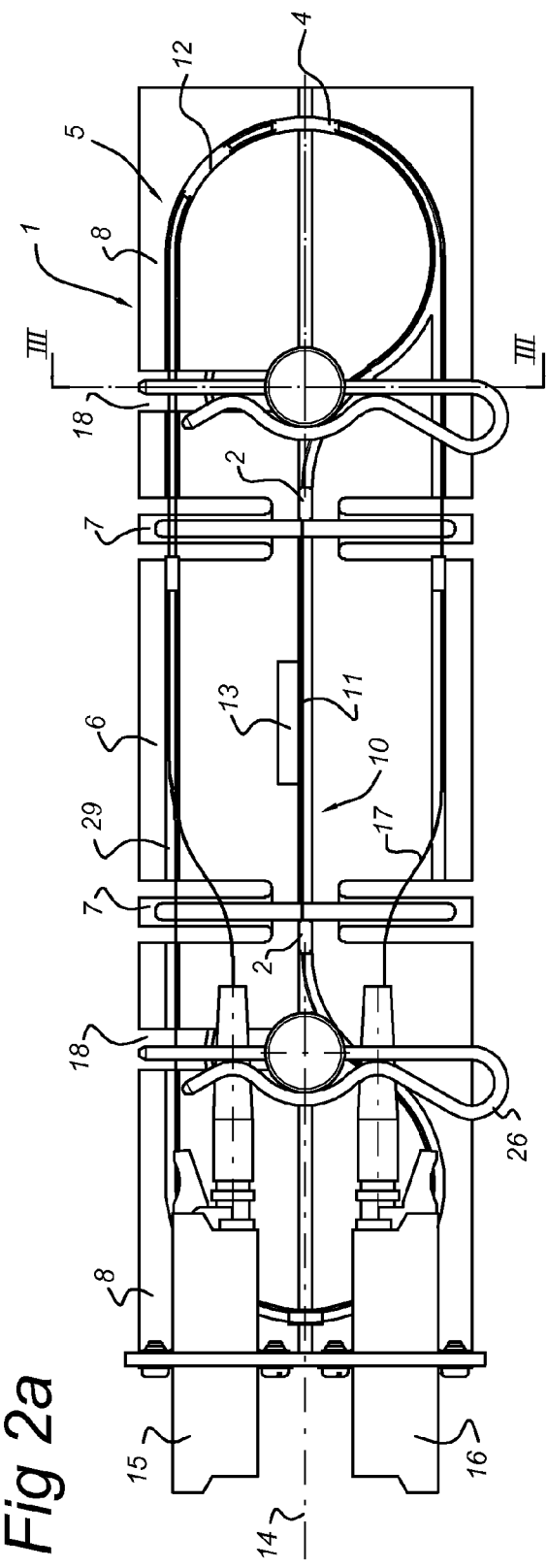
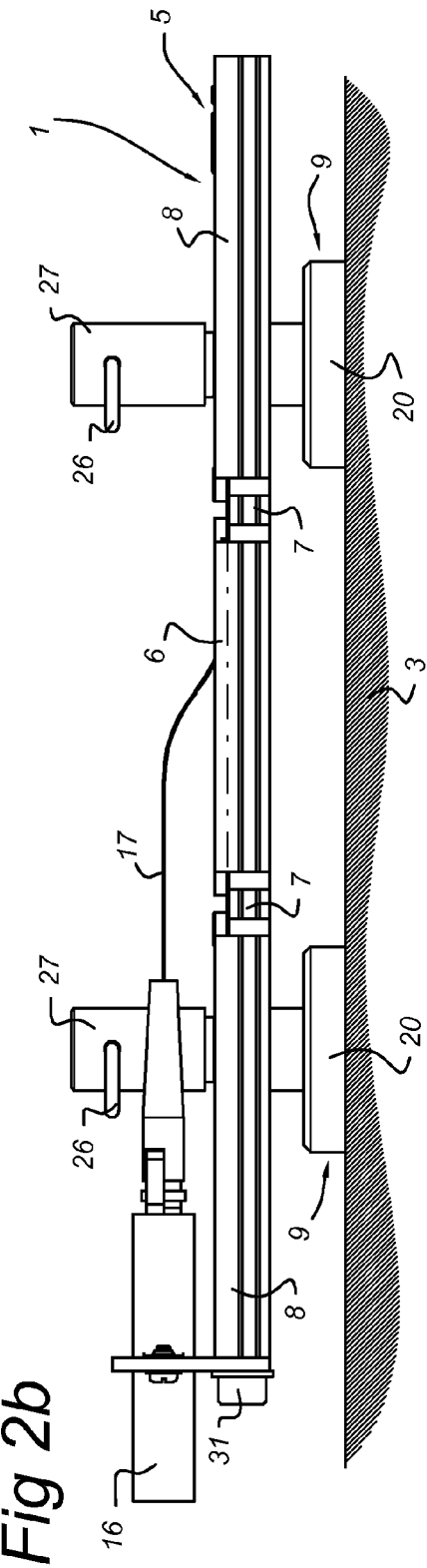

DEVICE AND METHOD FOR MEASURING STRAIN

The invention relates to a device for measuring strain on a surface of an object, comprising:
- a carrier which is provided with a central section and two end sections which are arranged on either side of the central section,
- a strain element which is connected to the carrier and is provided with a strain sensor.

EP1816432 discloses an optical strain gauge which is provided with a carrier and an optical fibre with a strain sensor. The carrier has a central section which extends along a longitudinal axis of the carrier. On both sides of the central section, there are attachment elements with an attachment surface for attachment to the surface of an object, the strain on which is to be measured. The optical fibre is arranged parallel to the longitudinal axis of the carrier between the attachment elements. The strain sensor of the optical fibre is situated at the location of the central section. By transmitting light through the optical fibre and measuring the wavelength of the light reflected by the strain sensor, the strain in the optical fibre can be determined. The attachment surfaces of the carrier are fixedly connected to the surface of the object, for example by bonding or spot-welding.

WO97/15805 describes a strainometer which works on the base of an optical fibre. A plurality of supporting feet is attached to a base plate which can in turn be attached to the surface to be measured. An optical fibre is wound around the supporting feet in a number of loops, and held securely in a holder. The base plate has to be fitted onto the surface to be measured in such a way that the base plate registers the stresses in the surface to be measured. The holder with the optical fibre is then placed over the supporting feet and pressed down forcefully.

A strain gauge is relatively delicate and susceptible to failure. In practice, strain gauges have to be repaired or replaced regularly. Since the strain gauge is fixedly connected to the surface of the object, an extensive quality control procedure and a recalibration of the strain gauge follows the repair or replacement of said strain gauge. Due to the fragility of the strain sensor and the required accuracy and reliability of the measurement signals, the repair or replacement of the strain gauge can only be carried out by staff with specialist technical knowledge. If the strain gauge is being used in a wind turbine, the calibration also has to take place under specific wind conditions. The repair and replacement of strain gauges is thus laborious and time-consuming, and so the maintenance costs of strain gauges are relatively high.

Furthermore, techniques are used with wind turbines which depend on accurate load measurements, for example load-reducing measures and so-called condition-monitoring techniques. In these cases, it is important that reliable strain measurements are available and that strain sensors can be replaced quickly and easily in case of failure.

It is an object of the invention to provide an improved device for measuring strain on a surface of an object.

According to the invention, this object is achieved by a device for measuring strain on a surface of an object, comprising a carrier which is provided with a central section and two end sections which are arranged on either side of the central section, a strain element which is connected to the carrier and is provided with a strain sensor, as well as two supporting feet which can be attached directly to the surface of the object at a distance apart, with the end sections of the carrier being detachably connected to in each case one supporting foot.

In the process of fitting, first the supporting feet are attached to the surface of the object of which the strain is to be measured at a predetermined distance apart. The strain in the object is determined by the change in length of the surface of the object between the positions of the supporting feet. As the supporting feet are fitted directly to the surface, very direct and accurate measurements are possible. A carrier which carries the strain element with the strain sensor is calibrated beforehand. After the supporting feet have been positioned accurately with respect to one another on the surface of the object, the precalibrated carrier is attached to the supporting feet by means of a detachable connection. When fitting the carrier for the first time, it is usually also necessary to calibrate the precalibrated carrier due to possible deviations in the position of the supporting feet. Such deviations may be due to prestress in the object during the attachment of the supporting feet to the surface. Subsequently, the carrier can be used to measure the strain on the surface of the object. Now when the strain sensor becomes defective, the complete unit comprising the carrier with the strain element and the strain sensor is replaced via the detachable connection with a new precalibrated carrier. The new carrier does not have to be calibrated again for deviations in the position of the supporting feet, since the supporting feet are attached to the surface in the same position on the object and the position of the supporting feet is known precisely. In the event of a defect, the repair of the device for measuring strain can therefore be carried out easily and quickly. In addition, the repair can be carried out by regular maintenance staff.

In one embodiment, the carrier has a longitudinal axis which is determined by a straight line between the supporting feet, and the strain element is attached to the carrier in two attachment locations in order to form a free section which extends substantially parallel to the longitudinal axis, and the free section is provided with the strain sensor. The free section of the strain element extends freely or loosely between the two attachment locations which are situated at a distance apart in the direction of the longitudinal axis. The free section extends for example partly or completely over the central section of the carrier.

In this case, it is possible for the ratio between, on the one hand, the distance between the supporting feet and, on the other hand, the distance between the attachment locations of the carrier to be in the range from 1 to 2. The greater this ratio, the greater the sensitivity of the strain measurements, i.e. the same strain results in a greater measurement result. However, the carrier may also be designed in such a manner that the ratio between, on the one hand, the distance between the supporting feet and, on the other hand, the distance between the attachment locations of the carrier is smaller than 1. This may result in reducing the strain in the strain sensor, which is advantageous for the service life.

For example, the distance between the supporting feet is greater than 5 cm, preferably greater than 8 cm, for example 10 cm. Thus, a mean strain across said dimensions can be measured. Known strain gauges are usually smaller and only allow local strain measurements. In order to achieve the abovementioned sensitivity, the distance between the attachment locations of the carrier is in that case for example smaller than 7 cm, preferably smaller than 6 cm, for example 5 cm.

In one embodiment, the strain element is provided with a temperature sensor. The temperature sensor is preferably attached to the carrier at a location which experiences substantially no strain. The measurement of the temperature sensor can be used to compensate for the strain measured by the strain sensor for temperature fluctuations. If the strain element is designed as an optical strain element with an optical fibre, the temperature sensor may be integrated in the optical fibre.

It is possible for the carrier to comprise at least one elastic section which is arranged between the central section and an end section of the carrier. When fitting the strain element, the free section thereof can be arranged between the attachment locations under prestress by squeezing the elastic section and attaching the strain element to the attachment locations of the end sections in this position. It is also possible to fit the carrier to the supporting feet under prestress. As a result thereof, the free section can measure both strain and pressure, i.e. positive and negative strain. In addition, the elastic section of the carrier reduces the forces exerted on the supporting feet when the carrier is expanded and compressed along the longitudinal axis. The displacements which occur in this case are after all largely absorbed by the elastic section. Furthermore, as a result of the use of the elastic section, the central section of the carrier hardly suffers from fatigue load, if at all, which is advantageous for the service life of the carrier.

In one embodiment, the carrier is provided with a monitoring element for monitoring the correct operation of the strain element. The monitoring element can for example be operated remotely. In one embodiment, the monitoring element is a heating element. By switching on the heating element, a strain is produced in the strain element. Using such a heating element, the action of the strain element can easily be checked remotely. This is advantageous in order to be able to detect non-detectable failure of a strain element.

It is possible for the supporting feet to each have an upright pin, with the end sections of the carrier each having a lateral receiving slot which runs substantially transversely with respect to the longitudinal axis, and with the lateral receiving slots being able to receive the upright pins, and with a cover element being arranged over each upright pin, and with a spring means being prestressed between the inner side of the cover element and the carrier. The carrier is prestressed by the spring means against the supporting feet. As a result thereof, the carrier is reliably arranged on the supporting feet, while the spring means can absorb any impact loads in order to protect the delicate strain element. However, the detachable connection can, of course, be produced in a different way, for example via a connection using bolts and nuts.

In one embodiment, the supporting feet each comprise two or more supporting foot parts which are each provided with a flat side, and the end sections of the carrier are provided with an opening having two bearing surfaces on either side of a longitudinal axis of the carrier, where the flat sides and bearing surfaces bear against one another during use. In this embodiment, the device is fitted to the object in an operationally reliable and strong manner.

In one embodiment, the strain element comprises an optical fibre. The strain sensor of the strain element comprises for example a so-called Bragg grating. Such a strain element has a long service life and is insensitive to electrical charges. However, the strain element can also comprise an electric strain gauge instead of an optical strain gauge.

It is possible for the supporting feet to each comprise a gluing chamber which is formed in the bottom surface of each supporting foot, with the bottom surface of each supporting foot being substantially annular and being filled with a first type of glue for attaching it to the surface of the object, and with the gluing chamber having a supply opening for a second type of glue for attaching the supporting foot to the surface of the object. The gluing chamber is designed as a hollow space at the bottom surface of each supporting foot. The supporting foot is first attached to the surface by means of the first type of glue, for example a quick-hardening glue. The first type of glue ensures that the supporting foot is accurately positioned. The strength of the adhesive connection is then achieved by supplying the second type of glue, for example a slow-hardening glue, via the supply opening. This second type of glue is, for example, better suited for absorbing strain.

The invention also relates to a method for measuring strain on a surface of an object, comprising:
providing a device as described above,
possibly pretreating the surface,
removably attaching the supporting feet to an accessory at a fixed distance apart,
fixing the supporting feet attached to the accessory to the surface,
removing the accessory,
removably attaching a first carrier to the supporting feet fixed to the surface,
calibrating the strain element of the first carrier.
The strain element of the first carrier is calibrated for the distance between the attached supporting feet.

In this case, it is possible for the first carrier to be removed from the supporting feet, and for a second carrier to be removably attached to the supporting feet, the second carrier substantially corresponding to the first carrier, and the second carrier having been precalibrated and not being calibrated again after it has been removably attached to the supporting feet. If the first carrier becomes defective, the first carrier can be replaced by a second carrier which has been precalibrated. After the second carrier has been attached, it is not necessary to calibrate the second carrier again for the distance between the attached supporting feet.

In a further embodiment, in which the strain element comprises an optical fibre which is secured in the carrier using a fastening material which largely surrounds the optical fibre, the method furthermore comprises monitoring the connection between the optical fibre and the carrier by measuring the optical properties of the optical fibre during use. Due to the fact that the fastening material surrounds the fibre, it affects the optical properties of the optical fibre, as a result of which deviations can be detected.

The invention will now be explained in more detail with reference to an exemplary embodiment illustrated in the drawing, in which:

FIG. 2a shows a top view of the device illustrated in FIG. 1;

FIG. 2b shows a side view of the device illustrated in FIG. 1;

FIG. 3 shows a cross-sectional view along from FIG. 2a;

Figure 8:
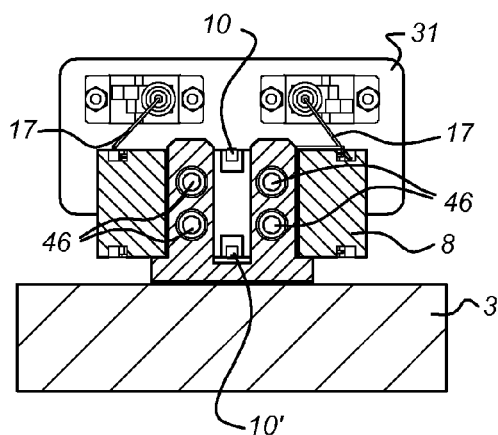
FIG. 8 shows a cross-sectional view of a fourth embodiment of the device from the present invention.
Figure 9:
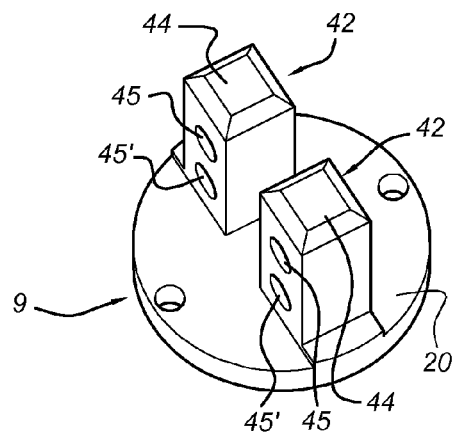

FIG. 9 shows a perspective view of a supporting foot as used in the embodiment from FIG. 8. The device 1 illustrated in the figures for measuring strain on a surface of an object 3 is suitable for different applications. For example, the device 1 can be used for strain measurements on the inner surface of a rotor blade of a wind turbine. The device 1 comprises a carrier 5, a strain element 10 and two supporting feet 9 which are directly attached to the surface of the object 3. The positions of the supporting feet 9 can solely or substantially solely move as a result of strain on the surface of an object 3 between the positions of the supporting feet 9.

The carrier 5 has a longitudinal axis 14. The carrier 5 comprises a central section 6, two elastic sections or spring sections 7 and two end sections 8. The end sections 8 are situated on either side of the central section 6, while the elastic sections 7 are situated between the central section 6 and the end sections 8. In this exemplary embodiment, those sections 6,7,8 are formed as an integral part. The central section 6 and the end sections 8 are substantially rigid. The elastic sections 7 are slightly resilient in the direction of the longitudinal axis 14. In this exemplary embodiment, each elastic section 7 has transverse incisions.

The strain element 10 is arranged on the carrier 5. The strain element 10 can be designed in various ways. For example, the strain element is an electronic strain element, in which the strain on the object is determined by means of a change in the electrical resistance of the strain element 10. In this exemplary embodiment, the strain element 10 is designed as an optical strain element with an optical fibre 17.

Figure 1:
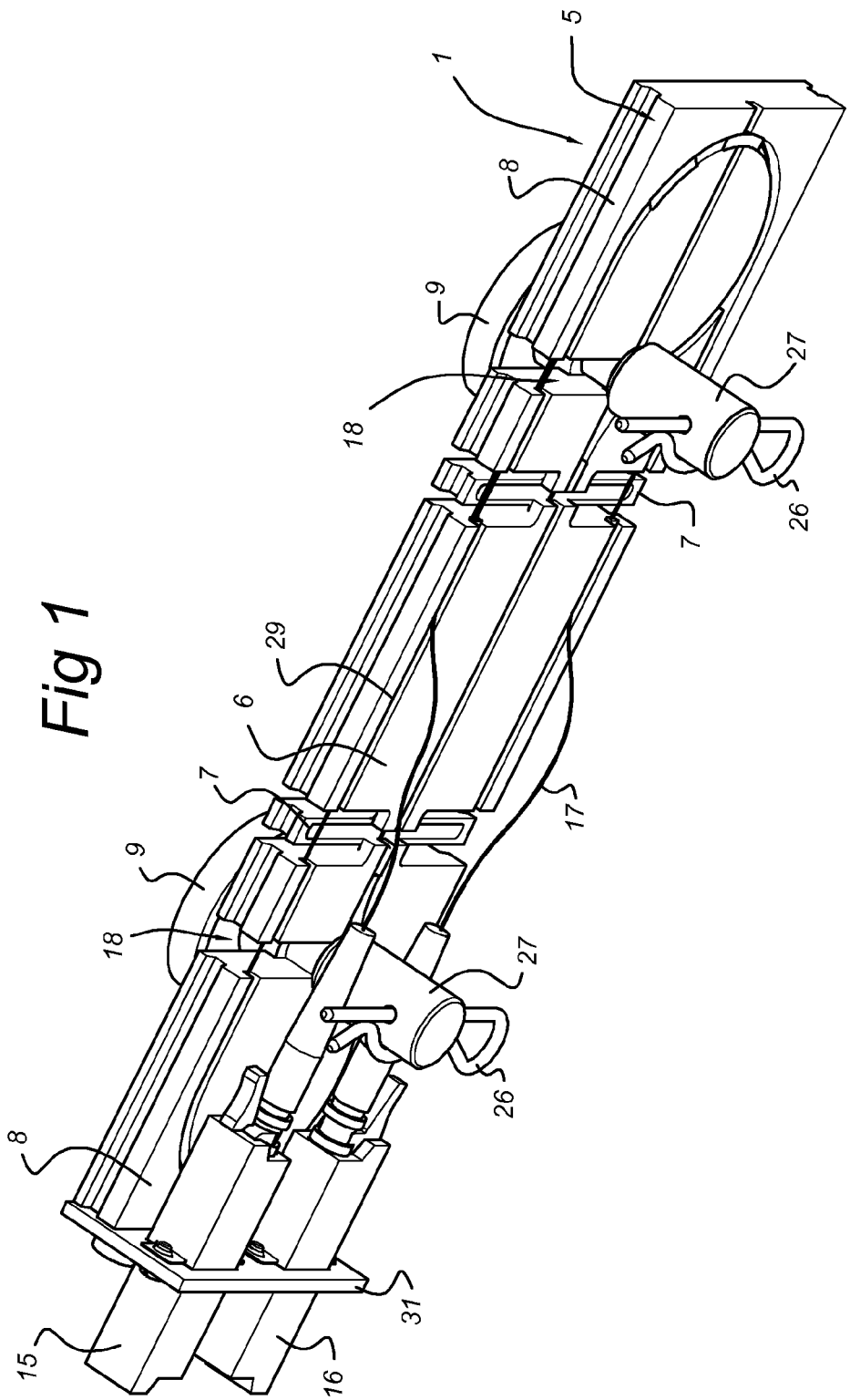
FIG. 1 shows a perspective view of a device for measuring strain on a surface of an object.
Figure 2C:
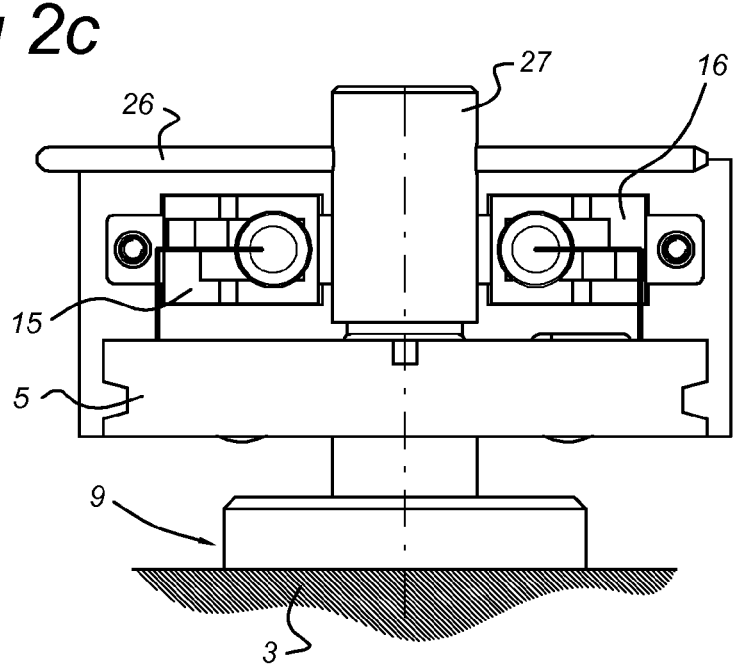
FIG. 2c shows a front view of the device illustrated in FIG. 1.

As is illustrated most clearly in FIGS. 1 and 2a, the carrier 5 has a slot-shaped duct 29, in which the optical fibre 17 is substantially accommodated. The optical fibre 17 extends from a first connecting piece 15 to a second connecting piece 16. The connecting pieces 15,16 are fitted to an end section 8 of the carrier 5 by means of an upright plate 31. The connecting pieces 15,16 can be connected to a measuring unit which is provided with a light source and a detector (not shown). During use, the light source sends a light beam through the optical fibre 17 via the first connecting piece 15.

The optical fibre 17 is locally attached to the end sections 8 of the carrier 5 at least two attachment locations 2, for example by gluing or otherwise bonding. The optical fibre 17 has a free section which extends freely between these two attachment locations 2. The free section of the optical fibre 17 extends substantially parallel to the longitudinal axis 14 across the central section 6. The free section of the optical fibre 17 comprises a strain sensor 11. The strain sensor 11 forms a measurement range for measuring strain. In this exemplary embodiment, the strain sensor 11 is designed as a so-called Bragg grating. The wavelength of the light reflected by the Bragg grating 11 is a measure of the strain which is exerted on the free section of the optical fibre 17 with the Bragg grating 11.

The optical fibre 17 is furthermore locally attached to a further attachment site 4 on the outer side of one of the end sections 8 of the carrier 5, for example by gluing or otherwise bonding. The outer side of an end section 8 is that section of the end section 8 which extends from the supporting foot 9 on the side which is turned away from the central section 6. In FIG. 2a, the outer side of the right-hand end section 8 is situated to the right of the right-hand supporting foot 9. The outer sides of the end sections 8 are substantially not subjected to strain.

The section of the optical fibre 17 which is locally attached on the outer side of the end section 8 has a temperature sensor 12. In this exemplary embodiment, the temperature sensor 12 is designed as a Bragg grating. Since the temperature sensor 12 is situated at a location which is substantially not subject to strain, the measurement from the temperature sensor 12 can be used to compensate the strain measured by the strain sensor 11 for temperature fluctuations.

Incidentally, it is possible for the carrier 5 to be provided with a monitoring element 13 which can be remote-controlled. By means of such a monitoring element 13, it is possible to test from a distance whether or not the strain element 10 is functioning properly. This makes it possible to prevent a non-detectable failure of a strain element 10. In the case of the strain element 10 in the form of a part of the glass fibre which is provided with a Bragg reflector 11, the monitoring element 13 may, for example, be a heating element which heats the central section 6 at the location of the strain element 10. As a result of the local heating, the strain element 10 expands, which effect has to be measurable. Alternatively, the monitoring element 13 may, for example, exert a mechanical force on the strain element 10.

The carrier 5 is detachably connected to the supporting feet 9. The supporting feet 9 and the detachable connection between the carrier 5 and the supporting feet 9 can be produced in various ways. In this exemplary embodiment, the supporting feet are formed as supporting columns or studs. The supporting feet 9 each comprise a base 20 and an upright pin 24 which protrudes from the base 20. The carrier 5 has two lateral receiving slots 18 which are arranged substantially transversely with respect to the longitudinal axis 14. The lateral receiving slots 18 substantially extend up to the longitudinal axis 14. The upright pins 24 of the supporting feet 9 can each be accommodated in in each case one of the lateral receiving slots 18 of the carrier 5.

In this exemplary embodiment, a spring means 25 is pushed onto each upright pin 24 (see FIG. 3) and a cover element 27 is arranged on top thereof. Each upright pin 24 has a through-opening which runs substantially transversely with respect to the longitudinal axis 14. The cover elements 27 are each provided with a corresponding through-opening which can be aligned with the through-openings of the upright pins 24 by pushing down these cover elements 27 against the action of the spring means 25. Obviously, the upright pins 24 can be tubular—instead of a single through-opening, there are then two aligned openings in each upright pin 24.

After the openings of the upright pins 24 and the openings of the cover elements 27 have been aligned with respect to one another, locking elements 26 can be pushed through, which are formed in this exemplary embodiment by resilient clamps having a straight section and a curved clamping section. The straight section can be accommodated in the openings of the upright pin 24 and cover element 27, while the clamping section can engage with the upright pin 24 in such a manner that the clamp 26 is fixed laterally.

By pushing down the cover elements 27 against the spring action of the spring means 25, the spring means 25 are prestressed between the inner side of the cover elements 27 and the carrier 5. The carrier 5 is thereby pushed downwards against the supporting feet 9. The carrier 5 can easily and quickly be connected to the supporting feet 9 by pushing the carrier 5 on the upright pins 24 and locking them with the cover elements 27 and the clamps 26. The carrier 5 can be detached in a simple manner by removing the clamps 26 and the cover elements 27 and pushing the carrier 5 away from the upright pins 24 of the supporting feet 9.

Although the elastic sections 7 of the carrier 5 can be omitted, the elastic sections 7 offer a number of advantages. The elastic sections 7 of the carrier 5 reduce the forces exerted on the supporting feet 9 when extending and compressing the carrier 5 along the longitudinal axis 14. The forces which are exerted during this process are after all largely absorbed by the elastic sections 7. In addition, due to the elastic sections 7, the carrier 5 hardly suffers from fatigue load, if at all, which is advantageous for the service life of the carrier 5. Due to the elastic sections 7, it is furthermore possible to apply a prestress on the free section of the optical fibre 17 before this is attached to the end sections of the carrier 5. The prestressed free section of the optical fibre 17 can then measure both strain and pressure.

Figure 3:
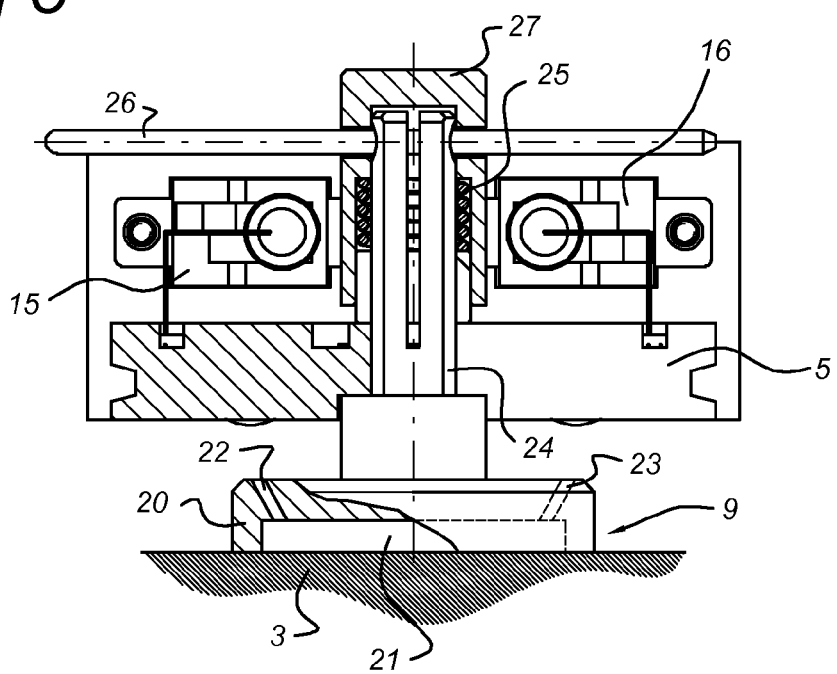
Figure 4:
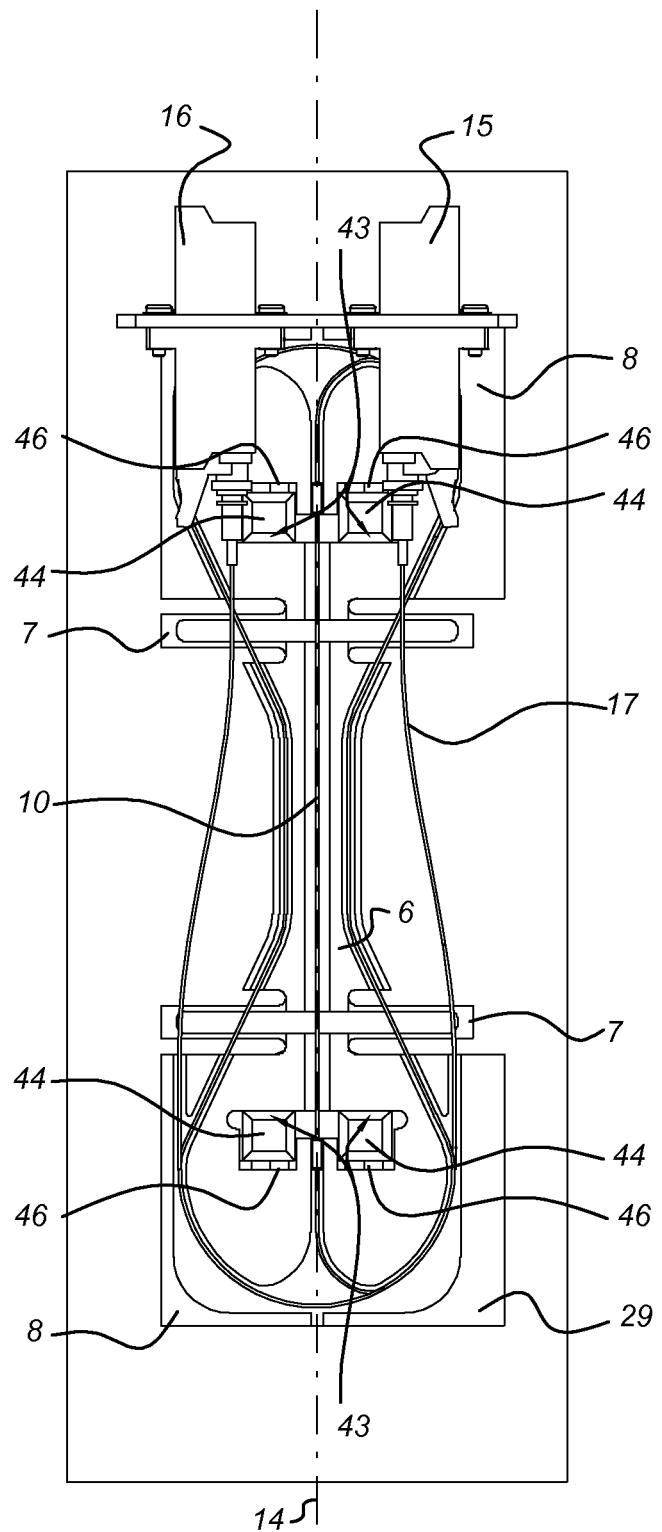
FIG. 4 shows a top view of a second embodiment of the device from the present invention.
Figure 5:
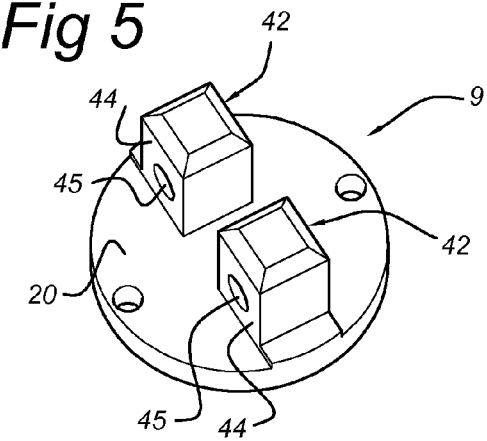
FIG. 5 shows a perspective view of a supporting foot as used in the embodiment of FIG. 4.

In a second embodiment of the present invention which is shown in top view in FIG. 4, it is possible to reduce the total length of the carrier 5. In this embodiment, the single upright pin 24 of the supporting foot 9 is replaced by two supporting foot parts 44. FIG. 5 is a perspective view of the supporting foot 9 which comprises two supporting foot parts 44 which protrude substantially at right angles from the base 20 (cf. the single upright pin 24 in the embodiment from FIGS. 1-3). Each supporting foot part 44 is provided on at least one side with a flat side 42, and with an attachment opening 45 on an opposite side. In the illustrated embodiment, the supporting foot parts 44 are of a square design, but could alternatively also be designed in the form of a flattened cylinder.

As illustrated in FIG. 4, each end section 8 of the carrier 5 is provided with an opening into which the supporting foot parts 44 can be inserted. The openings in end sections 8 form a number of bearing surfaces 43, against which the flat sides 42 of the supporting foot parts 44 bear during use. As the supporting feet 9 and carrier 5 are now fixed with respect to one another during use by the flat sides 42 and bearing surfaces 43 (which results in a greater surface than the embodiment from FIGS. 1-3 with a cylindrical contact surface), this embodiment offers a better resistance to twisting and the like, as a result of which more reliable measurements can be carried out.

In this embodiment, the supporting foot parts 44 of the supporting feet 9 are arranged symmetrically with respect to the strain element 10, on either side of the longitudinal axis 14. Due to the fact that there is an opening between the supporting foot parts 44, the fibre 17 can run along the longitudinal axis 14 over a longer distance and can run in a bend with the dimensions of the end section 8 being smaller. Thus, the total length of the carrier 5 can be smaller while the length of the strain element 10 remains the same, thus making a more compact construction possible.

Figure 6:
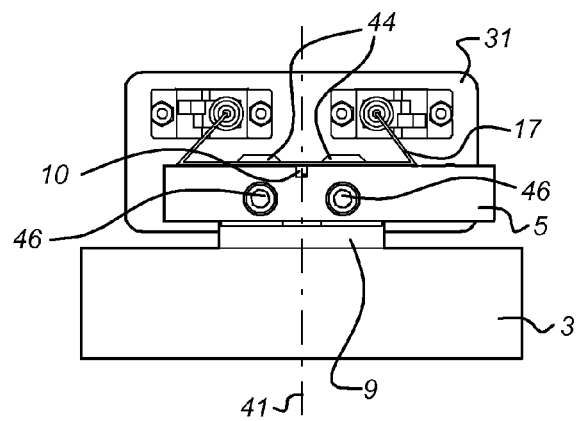
FIG. 6 shows a front view of the device from FIG. 4.

The supporting feet 9 are attached to the carrier 5 by means of, for example, bolts 46, which engage with the attachment openings 45, as has also been illustrated in the front view of FIG. 6. In this figure, it can also clearly be seen that in this embodiment the strain element 10 is positioned in a plane of symmetry 41 between the two supporting foot parts 44.

In the embodiment shown in FIG. 4, the slot-shaped duct 29 has a shape which is different from that of the embodiment in FIGS. 1-3, in particular in the central section 6. This makes it possible to make the central section 6 smaller, which results in less material being required and is advantageous with regard to the manufacturing costs.

In further embodiments, the device 1 is provided with a second strain element 10' which is substantially parallel to the strain element 10.

Figure 7:
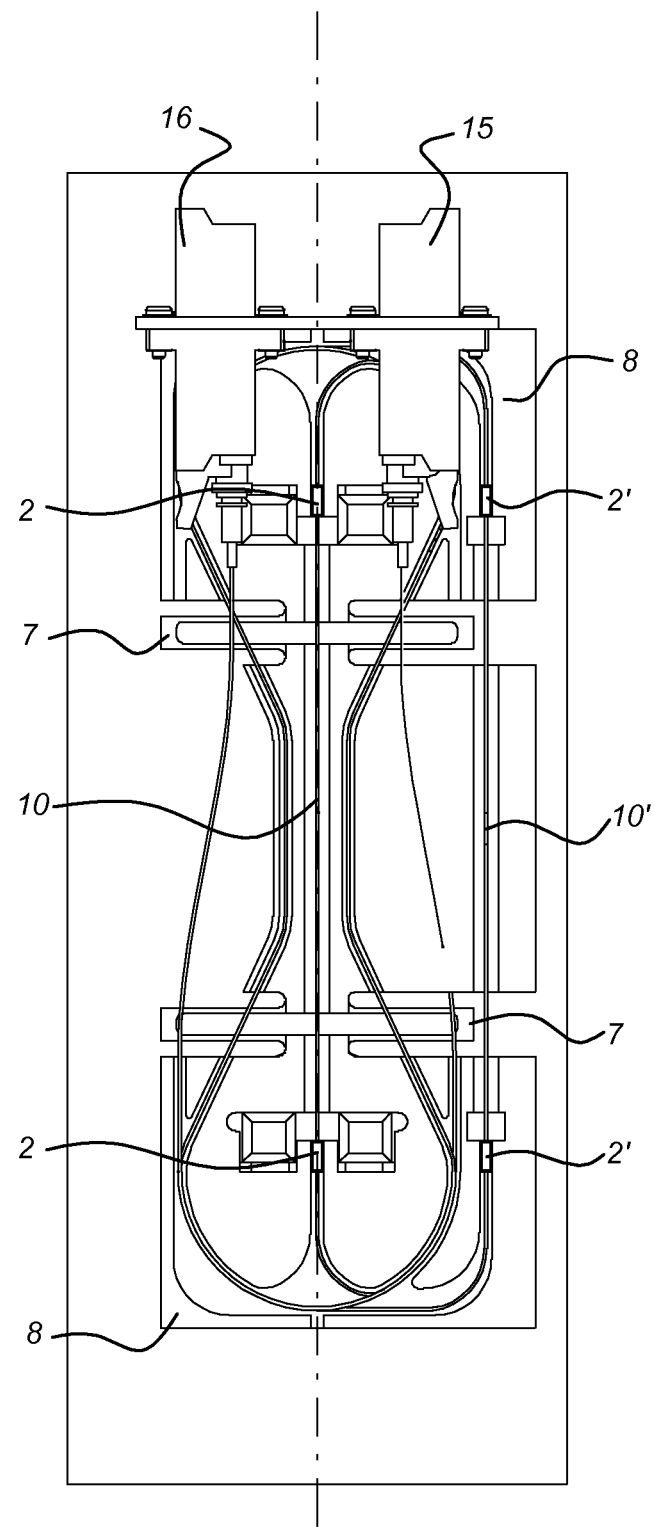
FIG. 7 shows a top view of a third embodiment of the device from the present invention.

FIG. 7 shows a first variant in which the strain element 10 and the second strain element 10' are substantially parallel to the surface of the object 3, in other words the strain elements 10 and 10' are in a plane parallel to the surface of object 3. As is illustrated, the second strain element 10' is also fixed in the end sections 8 by means of secondary attachment locations 2'. Since the second strain element 10' is not situated on the longitudinal axis 14, but rather parallel thereto, it is possible to measure a rotation in the surface of the object 3 (about the longitudinal axis 14), since in that case different strains occur in the strain element 10 and in the second strain element 10'.

FIG. 8 shows a second variant in cross section, in which the strain element 10 and the second strain element 10' are situated in the middle between the supporting foot parts 44, but at different distances to the surface of the object 3. The strain element 10 and the second strain element 10' are again substantially parallel to the surface of the object and in a plane at right angles to the surface of object 3. This embodiment can also be seen as a combination of two devices 1 from the embodiments in FIGS. 1-3 which have been placed one above the other with a certain distance between the strain element 10 and second strain element 10'. By means of this variant, it is possible to measure a bend in the surface of the object 3 due to the fact that the strain in the strain element 10 and the second strain element 10' is different.

In the variant as illustrated in FIG. 8, use is made in an embodiment of longer supporting foot parts 44 which are each provided with two attachment openings 45 which are fixed in the end section 8 using in each case two bolts 46, as is illustrated in the perspective view from FIG. 9. Due to this type of attachment, the strain element 10 and the second strain element 10' are fixed well in their position in this embodiment, thus making the device reliable during use.

Further variants are possible in which, for example, the embodiments from FIGS. 7 and 8 are combined, with three strain elements 10, 10' then in fact being present. Variants are also conceivable in which the strain element 10 and the second strain element 10' are not positioned parallel to one another, but are at an angle to one another. With these embodiments, complex deformations of the surface of the object 3 can also be determined.

In a further embodiment of the present invention, the fibre 17 may be provided with a separate Bragg grating at the location of the attachment locations 2, 2'. This makes it possible to monitor whether the attachment (bonding) of the fibre 17 is still intact at the attachment locations 2 during use (i.e. when the device 1 is placed on the object 3, as a result of which the device 1 is in many cases hardly accessible, if at all). In general, the optical fibre 5 in the carrier 5 is fixed with a fastening material which largely surrounds the optical fibre 17 (in the periphery of the fibre 17). Since the fastening material (for example glue) around the fibre 17 affects the optical properties of this fibre 17, a local deviation (for example partial detachment of the fastening material) during use can be detected.

In order to arrange the device 1 for measuring strain on the surface of the object 3, the following method may be used. If necessary, the surface of the object 3 is first pretreated. During pretreatment, the surface of the object 3 is, for example, made suitable for accommodating the supporting feet 9 in a single plane. Thereafter, the supporting feet 9 are directly attached to the surface by means of an accessory.

The accessory is designed such that the supporting feet 9 are attached a predetermined distance apart on the surface of the object 3. The accessory is substantially a rigid dummy carrier. The accessory comprises means for positioning the supporting feet 9 with respect to one another. In accordance with the exemplary embodiment illustrated in the figures, the accessory may be provided with lateral receiving slots for accommodating the supporting feet with the same dimensions as the carrier 5. The supporting feet 9 which are arranged a fixed distance apart in the accessory can then be attached to the surface of the object 3.

Fixing the supporting feet 9 attached to the accessory to the surface of the object 3 can be effected in various ways. In this exemplary embodiment, the supporting feet 9 are bonded to the surface of the object using two different kinds of glue. The base 20 of each supporting foot 9 has a bottom surface which can be attached to the surface of the object 3. In the bottom surface of the base 20, a gluing chamber 21 is provided, so that the remaining bottom surface of the base 20 is annular (see FIG. 3). The gluing chamber 21 has a supply opening 22 for glue and a discharge opening 23.

The annular bottom surface can be glued to the surface of the object 3 via a quick-hardening glue. The supporting foot 9 is, for example, fixed within 2-4 minutes using such a quick-hardening glue, for example within 3 minutes. Subsequently, it is possible to provide a slow-hardening glue in the gluing chamber 21 via the supply opening 22. The slow-hardening glue hardens in, for example, more than 6 hours, for example 10 hours. The slow-hardening glue is better suited to absorb strain than the quick-hardening glue, while the quick-hardening glue makes accurate positioning on the surface of the object 3 possible.

After the supporting feet 9 have been fixed firmly and reliably on the surface of the object 3, a precalibrated carrier 5, that is to say a carrier 5 with a precalibrated strain element 10 is detachably connected to the supporting feet 9. In this exemplary embodiment, the detachable connection is formed by the clamps 26 and the cover elements 27. In addition, it is usually necessary to calibrate the precalibrated carrier 5 with regard to possible deviations from the position of the supporting feet 9 attached by means of the accessory. Such deviations may be the result of prestress in the object 3 during fixing of the supporting feet 3 to the surface. The carrier 5 can now be used to measure the strain on the surface of the object 3.

When the strain element 10 of the carrier 5 becomes defective, the carrier 5 with the defective strain element 10 is removed in its entirety and replaced by a new carrier 5 with a precalibrated strain element 10. The new carrier 5 does not have to be calibrated again with regard to possible deviations in the position of the supporting feet 9 attached by means of the accessory. Replacement is thus simple and quick. The new carrier 5 is again detachably connected to the supporting feet 9.

In the context of calibration, the terms gain and offset are commonly used. In this exemplary embodiment, the gain is determined by the ratio between the wavelength variation of the strain sensor and the strain variation. The offset forms a zero shift which is determined by the distance between the supporting feet 9, the distance between the attachment locations on the carrier 5, and the adhesive bond of the optical fibre 17 with the carrier 5. The gain and the offset due to the distance between the attachment locations on the carrier 5 and the adhesive bond of the optical fibre 17 with the carrier 5 can be determined beforehand. It is thus possible to calibrate the carriers 5 beforehand. The offset as a result of the distance between the supporting feet 9 can only be determined on location. Usually, this only has to be carried out once. When a second carrier 5 is being fitted, this offset is then known. Incidentally, it may be necessary to determine the offset again after the new, second carrier 5 has been fitted.

The invention is not limited to the exemplary embodiment illustrated in the figures. The person skilled in the art can make various modifications which fall within the scope of the invention. For example, the detachable connection can also be achieved by means of a bolt/nut connection or by laminating the supporting feet during the production of a rotor blade of a wind turbine.

The invention claimed is:

1. A device for measuring strain on a surface of an object, comprising:
    a carrier which is provided with a central section and two end sections which are arranged on either side of the central section,
    a strain element which is connected to the carrier and is provided with a strain sensor,
    in which two supporting feet are provided which are attached directly to the surface of the object to be measured at a distance apart, and the end sections of the carrier are detachably connected to, in each case, one supporting foot, and
    in which the carrier has a longitudinal axis which is determined by a straight line between the supporting feet, and in which the strain element is attached to the carrier at two attachment locations in order to form a free section which extends substantially parallel to the longitudinal axis, and in which the free section is provided with the strain sensor.

2. The device of claim 1, in which the ratio between, on the one hand, the distance between the supporting feet and, on the other hand, the distance between the attachment locations of the carrier is in the range from 1 to 2 or is smaller than 1.

3. The device of claim 1, in which the distance between the supporting feet is greater than 5 cm.

4. The device of claim 1, in which the distance between the attachment locations of the carrier is smaller than 7 cm.

5. The device of claim 1, in which the strain element is provided with a temperature sensor.

6. The device of claim 1, in which the carrier comprises at least one elastic section which is arranged between the central section and an end section of the carrier.

7. The device of claim 6, in which the free section of the strain element is arranged between the attachment locations under prestress.

8. The device of claim 1, in which the carrier is provided with a monitoring element for monitoring the correct operation of the strain element.

9. The device of claim 1, in which the supporting feet each have an upright pin, and in which the end sections of the carrier each have a lateral receiving slot which runs substantially transversely with respect to the longitudinal axis, and in which the lateral receiving slots can receive the upright pins, and in which a cover element is arranged over each upright pin, and in which a spring means is prestressed between the inner side of the cover element and the carrier.

10. The device of claim 1, in which the supporting feet each comprise two or more supporting foot parts which are each provided with a flat side, and the end sections of the carrier are provided with an opening having two bearing surfaces on either side of a longitudinal axis of the carrier, in which the flat sides and bearing surfaces bear against one another during use.

11. The device of claim 1, in which the strain element comprises an optical fibre, and in which a temperature sensor is incorporated in the optical fibre.

12. The device of claim 1, in which the strain element comprises an electric strain gauge.

13. A device for measuring strain on a surface of an object, comprising:
    a carrier which is provided with a central section and two end sections which are arranged on either side of the central section,
    a strain element which is connected to the carrier and is provided with a strain sensor,
    in which two supporting feet are provided which can be attached directly to the surface of the object at a distance apart, and the end sections of the carrier are detachably connected to in each case one supporting foot, and
    in which the supporting feet each comprise a gluing chamber which is formed in the bottom surface of each supporting foot, in which the bottom surface of each supporting foot is substantially annular and is filled with a first type of glue for attaching it to the surface of the object, and in which the gluing chamber has a supply opening for a second type of glue for attaching the supporting foot to the surface of the object.

14. A method for measuring strain on a surface of an object, comprising:
- providing a device according to claim 1,
- removably attaching the supporting feet to an accessory at a fixed distance apart,
- fixing the supporting feet attached to the accessory to the surface,
- removing the accessory,
- removably attaching a carrier to the supporting feet fixed to the surface,
- calibrating the strain element of the carrier.

15. The method of claim 14, in which the carrier is removed from the supporting feet, and in which a further carrier is removably attached to the supporting feet, in which the further carrier substantially corresponds to the carrier, and in which the further carrier has been precalibrated and is not calibrated again after it has been removably attached to the supporting feet.

16. The method of claim 14, in which the strain element comprises an optical fibre which is secured in the carrier using fastening material which largely surrounds the optical fibre, and in which the method furthermore comprises monitoring the connection between the optical fibre and the carrier by measuring the optical properties of the optical fibre during use.

17. The device of claim 1, in which the ratio between, on the one hand, the distance between the supporting feet and, on the other hand, the distance between the attachment locations of the carrier is smaller than 1.

18. The device of claim 1, in which the distance between the supporting feet is greater than 8 cm.

19. The device of claim 1, in which the distance between the attachment locations of the carrier is smaller than 6 cm.

* * * * *